(12) United States Patent
Okuyama

(10) Patent No.: US 11,054,365 B2
(45) Date of Patent: Jul. 6, 2021

(54) MICROSCOPIC ANALYSIS DEVICE

(71) Applicant: Shimadzu Corporation, Kyoto (JP)

(72) Inventor: Shuhei Okuyama, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 148 days.

(21) Appl. No.: 16/074,906

(22) PCT Filed: Sep. 20, 2016

(86) PCT No.: PCT/JP2016/077673
§ 371 (c)(1),
(2) Date: Aug. 2, 2018

(87) PCT Pub. No.: WO2017/145422
PCT Pub. Date: Aug. 31, 2017

(65) Prior Publication Data
US 2019/0033207 A1    Jan. 31, 2019

(30) Foreign Application Priority Data

Feb. 23, 2016  (JP) .............................. JP2016-032232

(51) Int. Cl.
*G02B 17/06* (2006.01)
*G01N 21/27* (2006.01)
(Continued)

(52) U.S. Cl.
CPC ............. *G01N 21/27* (2013.01); *G02B 17/06* (2013.01); *G02B 17/08* (2013.01); *G02B 21/00* (2013.01); *G02B 21/04* (2013.01)

(58) Field of Classification Search
CPC ...... G01N 21/27; G01N 21/17; G01N 21/552; G01N 21/49; G01N 21/05; G01N 21/3504;
(Continued)

(56) References Cited

U.S. PATENT DOCUMENTS 4,623,223 A * 11/1986 Kempf .................. G02B 17/06
359/472
5,932,871 A * 8/1999 Nakagawa ........... G02B 21/008
250/201.3
(Continued)

FOREIGN PATENT DOCUMENTS

AT         472119 T      7/2010
EP         1184703 A1    3/2002
(Continued)

OTHER PUBLICATIONS

International Preliminary Report on Patentability and Written Opinion of the ISA dated Aug. 23, 2018 of corresponding International Application No. PCT/JP2016/077673; 9 pgs.
(Continued)

*Primary Examiner* — William R Alexander
*Assistant Examiner* — Rahman Abdur
(74) *Attorney, Agent, or Firm* — Maier & Maier, PLLC

(57) ABSTRACT

A microscopic analysis apparatus including a concentrating optical system 5 that concentrates measurement light emitted from a sample in a measuring area on a first concentration point, an aperture plate having an opening located at the first concentration point, an elliptical concave mirror 8 that reflects measurement light passing through the opening and concentrates the reflected measurement light on a second concentration point, a shielding plate disposed in front of the second concentration point, a through-hole having an end surface, whose shape coincides with a shape of a cross section of a light flux of measurement light at the position, being formed in the shielding plate, and a photodetector provided at the second concentration point. In this way, it is possible to allow more measurement light to enter the photodetector without allowing light outside the measuring area to enter the photodetector.

4 Claims, 3 Drawing Sheets

(51) Int. Cl.
*G02B 17/08* (2006.01)
*G02B 21/00* (2006.01)
*G02B 21/04* (2006.01)

(58) Field of Classification Search
CPC ........ G02B 21/00; G02B 17/08; G02B 21/04; G02B 17/06; G02B 21/06; G02B 21/245; G03F 7/70175; G03F 7/70058
USPC .......................................................... 359/368
See application file for complete search history.

(56) References Cited

U.S. PATENT DOCUMENTS

| | | | | |
|---|---|---|---|---|
| 6,120,166 | A * | 9/2000 | Price | G01J 3/10 362/302 |
| 2002/0033452 | A1 * | 3/2002 | Hoult | G01J 3/2803 250/332 |
| 2013/0215406 | A1 * | 8/2013 | Heussler | G01J 3/4531 355/67 |
| 2013/0236982 | A1 * | 9/2013 | Bakker | G01N 21/648 436/172 |
| 2014/0002819 | A1 * | 1/2014 | Kawata | G01J 3/0208 356/326 |
| 2015/0204788 | A1 * | 7/2015 | Pangarkar | G01N 33/5005 435/39 |
| 2016/0306149 | A1 * | 10/2016 | Eisenberg | H04N 5/332 |

FOREIGN PATENT DOCUMENTS

| | | |
|---|---|---|
| JP | H07-63994 A | 3/1995 |
| JP | H09-274139 A | 10/1997 |
| JP | H10-104522 A | 4/1998 |
| JP | 2001-174708 A | 6/2001 |
| JP | 2002-188958 A | 7/2002 |
| WO | 1997/038341 A1 | 10/1997 |

OTHER PUBLICATIONS

International Search Report dated Dec. 27, 2016 of corresponding application No. PCT/JP2016/077673; 5 pgs.

* cited by examiner

MICROSCOPIC ANALYSIS DEVICE

FIELD

The present invention relates to a microscopic analysis apparatus that collects light emitted from a minute measuring area of a sample, concentrates the collected light on a photodetector using an elliptical concave mirror, and performs analysis, and particularly relates to an infrared microscope.

BACKGROUND

A microscopic analysis apparatus is used for analyzing a minute measuring area on a sample surface. In an infrared microscope which is a microscopic analysis apparatus, a sample is analyzed by irradiating the sample with infrared light and obtaining a spectrum of transmitted infrared light or reflected infrared light (for example, Patent Literature 1).

FIG. 1 illustrates a configuration of a main part of a transmission-type infrared microscope which is a conventionally used infrared microscope. Infrared light (measurement light) irradiated from an infrared light source 101 to penetrate a sample 102 is concentrated on a small-diameter opening (aperture) 106 of an aperture plate by a Cassegrain mirror 105 including a set of a concave mirror 103 and a convex mirror 104 provided with through-holes at centers. The measurement light passing through the aperture 106 propagates while spreading again, is reflected by a half mirror (also referred to as a hot mirror) 107 that transmits visible light and reflects infrared light, and is subsequently concentrated on an infrared detector 109 again by an elliptical concave mirror 108. The infrared detector 109 wavelength-separates and measures the measurement light.

The elliptical concave mirror 108 has an elliptical arcuate cross-section whose focal points correspond to the aperture 106 and a concentration position inside the infrared detector 109 within a plane including an optical axis of the incident measurement light and an optical axis of the reflected measurement light. In addition, a spheroidal surface obtained by rotating the arc around a straight line connecting both the focal points is formed outside the plane. In this way, the elliptical concave mirror 108 concentrates light spreading from one focal point (the aperture 106) on the other focal point (the inside of the infrared detector 109). In general, a light-concentrating optical element requires that (1) a penetrating wavelength band be wide and there be no wavelength band in which absorption is large within a range thereof, (2) a refractive index not be too large, (3) an easily processed and easily manufactured material be used, (4) a price be low, and (5) a resistance to environment be excellent. However, there is no lens that satisfies all these requirements in a wavelength band of infrared light, and thus an elliptical concave mirror is used for concentrating infrared light in many cases. An imaging lens 110 and an imaging unit 111 provided above the sample 102 are used for irradiating a surface of the sample 102 with visible light from a visible light source (not illustrated) and checking a state thereof.

PRIOR ART DOCUMENT

Patent Literature

[Patent Literature 1] JP-A-7-63994

SUMMARY

FIG. 2 is an enlarged view of an optical path of measurement light from the half mirror 107 to the infrared detector 109. When infrared light from the outside of the measuring area is incident on the infrared detector 109 in the infrared microscope, accuracy of measurement decreases. For this reason, as illustrated in FIG. 2, a shielding plate (cold aperture plate) provided with a cylindrical through-hole (cold aperture) 109a is provided on an incident surface of the infrared detector 109, so that only light incident on the cold aperture 109a is allowed to enter the inside of the infrared detector 109, and light from the outside the measuring area is blocked.

As described above, measurement light passing through the aperture 106 propagates while spreading, is reflected by the elliptical concave mirror 108, and is concentrated on the inside of the infrared detector 109. In this instance, a light flux of the measurement light reflected by the elliptical concave mirror 108 has a substantially conical shape and is concentrated on the inside of the infrared detector 109. However, the light flux precisely corresponds to a conical shape distorted with respect to a main axis (optical axis) (hereinafter referred to as a "deformed conical shape"). Specifically, when an angle of a ray of measurement light passing through a left end with respect to an optical axis of measurement light (a vertical line passing through an apex of a cone) is set to θa, and an angle of a ray of measurement light passing through a right end is set to θb on a paper surface illustrated in FIG. 2, an asymmetric cross section satisfying θb>θa is included.

As described above, the cold aperture 109a has a cylindrical shape, and an incident-side end surface thereof has a circular shape. For this reason, in the case of making an attempt to allow all the measurement light fluxes to enter a light receiving portion, light outside the measuring area enters the light receiving portion from the left side of the optical axis as illustrated in FIG. 3(a). In addition, in the case of making an attempt to block light outside the measuring area, there is a problem that a part of measurement light is blocked as illustrated in FIG. 3(b).

Here, the infrared microscope which is a typical apparatus has been described as an example. However, the problem is not limited to infrared light, and the same problem as that described above arises in every apparatus having a configuration in which light emitted from a measuring area of a sample is concentrated on an aperture, and light passing through the aperture is concentrated on a photodetector again using an elliptical concave mirror.

A problem to be solved by the invention is to allow more measurement light to enter a photodetector without allowing light outside a measuring area to enter the photodetector in a microscopic analysis apparatus that concentrates measurement light emitted from a measuring area of a sample on a photodetector using an elliptical concave mirror.

A microscopic analysis apparatus according to the invention made to solve the above-mentioned problem is characterized by including a) a concentrating optical system that concentrates measurement light emitted from a sample in a measuring area on a first concentration point, b) an aperture plate having an opening located at the first concentration point, c) an elliptical concave mirror that reflects measurement light passing through the opening and concentrates the reflected measurement light on a second concentration point, d) a shielding plate disposed in front of the second concentration point, a through-hole having an end surface, whose shape coincides with a shape of a cross section of a light flux of measurement light at a position of the shielding plate, being formed in the shielding plate, and e) a photodetector provided at the second concentration point.

For example, a Cassegrain mirror may be used for the concentrating optical system.

In addition, the elliptical concave mirror is a concave mirror having a spheroidal surface whose two focal points correspond to the first concentration point and the second concentration point.

A light flux of measurement light reflected by the elliptical concave mirror has a conical shape (deformed conical shape) distorted with respect to a main axis (optical axis). For example, a conventionally used shielding plate, in which a cylindrical through-hole is formed, disposed such that a cross section has a circular shape may be used as the shielding plate in which the through-hole having the end surface, whose shape coincides with the shape of the cross section of the light flux of the measurement light, may be formed. In this case, only arrangement of a conventionally used photodetector and shielding plate may be changed, and a configuration may be obtained at low cost.

In addition, the shielding plate may be set to a shielding plate which is disposed to be perpendicular to an optical axis of a light flux of measurement light as in the past and in which a through-hole having an incident-side end surface whose shape coincides with the shape of the cross section may be formed. In this case, it is possible to allow more measurement light than in the past to enter without allowing light outside a measuring area to enter while maintaining the same arrangement as that in the past.

In the microscopic analysis apparatus according to the invention, a cross section of a measurement light flux having a deformed conical shape coincides with a shape of an incident-side end surface of a through-hole, and thus it is possible to allow more measurement light to enter a photodetector without allowing light outside a measuring area to enter the photodetector.

When a microscopic analysis apparatus according to the invention is used, it is possible to allow more measurement light to enter a photodetector without allowing light outside a measuring area to enter the photodetector.

BRIEF DESCRIPTION

DETAILED DESCRIPTION OF EMBODIMENTS

Figure 4:
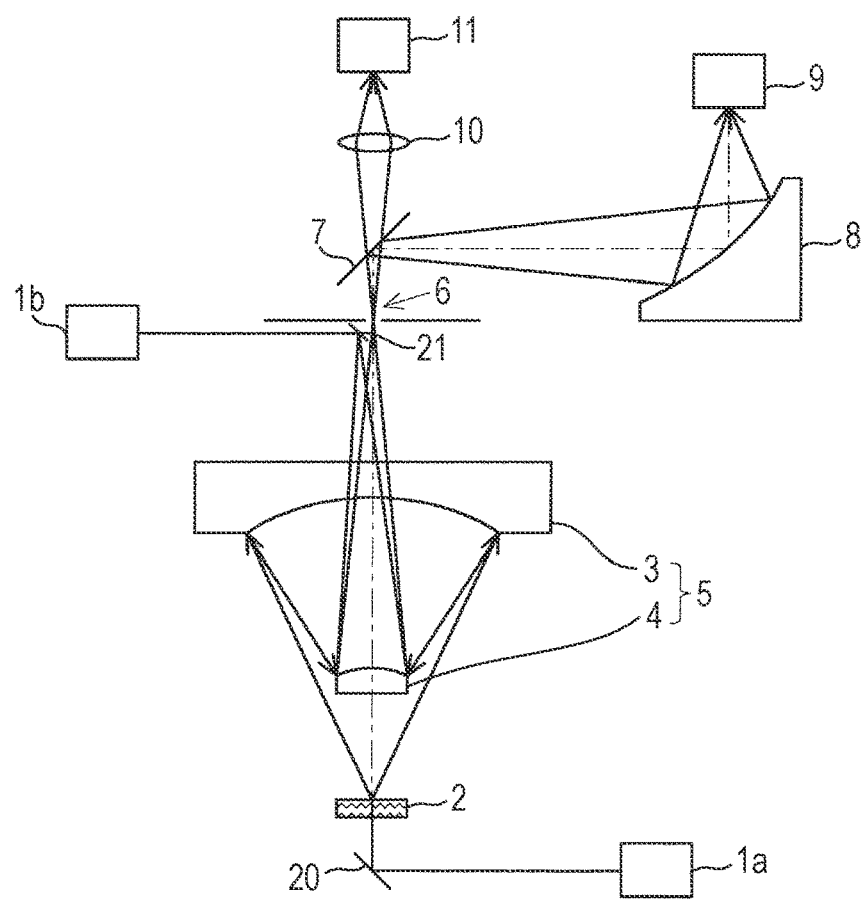
FIG. 4 is a main part configuration diagram of an infrared microscope which is an embodiment of a microscopic analysis apparatus according to the invention.

Hereinafter, a description will be given of an infrared microscope which is an embodiment of a microscopic analysis apparatus according to the invention with reference to FIG. 4 to FIG. 6. FIG. 4 is a main part configuration diagram of the infrared microscope of the present embodiment.

The infrared microscope of the present embodiment has a configuration in which both transmitted light and reflected light from a sample 2 can be measured. In the case of measuring transmitted light, infrared light is irradiated from a transmission measurement infrared light source 1a which is a ceramic light source such as SiC, SiN, etc. through a mirror 20 from below the sample 2. The infrared light (transmission measurement light) penetrating the sample 2 is concentrated on a first concentration point of a small-diameter opening (aperture) 6 of an aperture plate by a Cassegrain mirror 5 including a set of a concave mirror 3 and a convex mirror 4 provided with through-holes at centers. The measurement light passing through the aperture 6 propagates while spreading again, is reflected by a half mirror (hot mirror) 7 that transmits visible light and reflects infrared light, and is subsequently concentrated on a second concentration point inside an infrared detector 9 again by an elliptical concave mirror 8.

The infrared detector 9 is a highly sensitive Mercury Cadmium Telluride (MCT) detector, and is cooled by liquid nitrogen together with a cold aperture plate described below. The elliptical concave mirror 8 is a concave mirror having a spheroidal surface whose focal points correspond to a concentration point of transmission measurement light inside the aperture 6 and a concentration point of transmission measurement light inside the infrared detector 9. The infrared detector 9 wavelength-separates and measures the measurement light.

In the case of measuring reflected light, infrared light is irradiated from a reflection measurement infrared light source 1b which is a ceramic light source similar to the described above through a half mirror 21 and the Cassegrain mirror 5 from above the sample 2. The infrared light (reflection measurement light) reflected on a surface of the sample 2 is concentrated on the first concentration point of the aperture 6 as described above, reflected by each of the half mirror 7 and the elliptical concave mirror 8, and concentrated on the second concentration point inside the infrared detector 9.

The imaging lens 10 and the imaging unit 11 provided above the sample 2 are used for irradiating the surface of the sample with visible light from a visible light source (not illustrated) and checking a state thereof.

Figure 1:
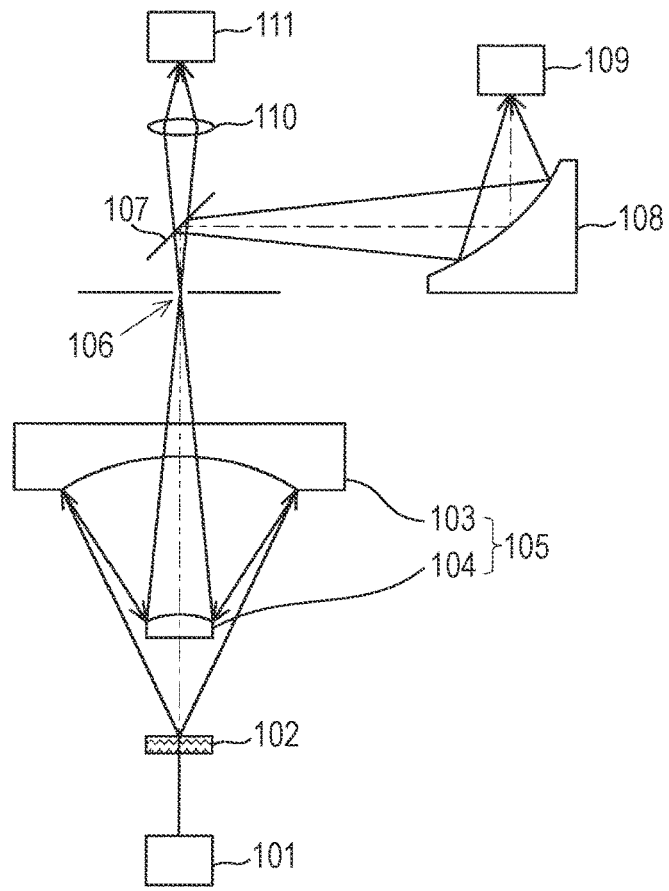
FIG. 1 is a main part configuration diagram of an infrared microscope.
Figure 2:
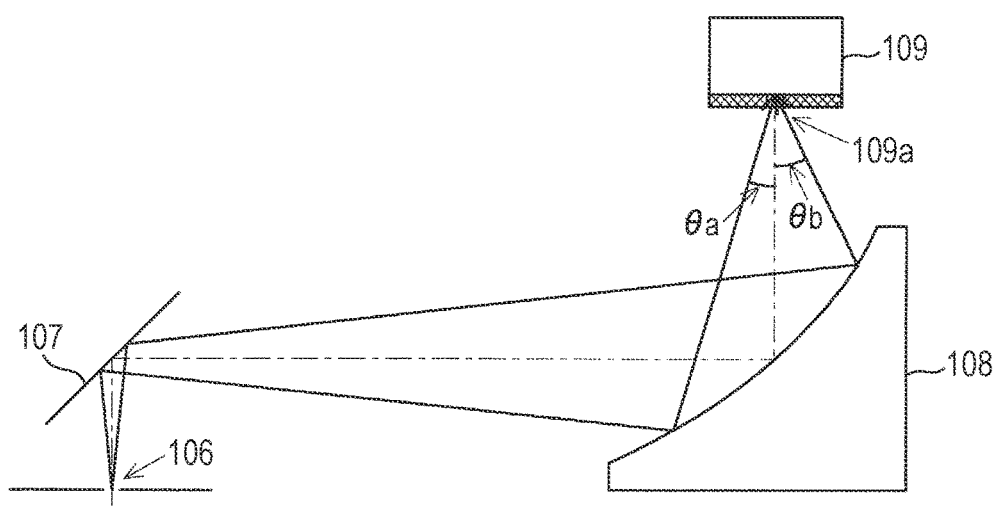
FIG. 2 is an enlarged view of an optical path of measurement light from a half mirror to an infrared detector in a conventional infrared microscope.
Figure 5:
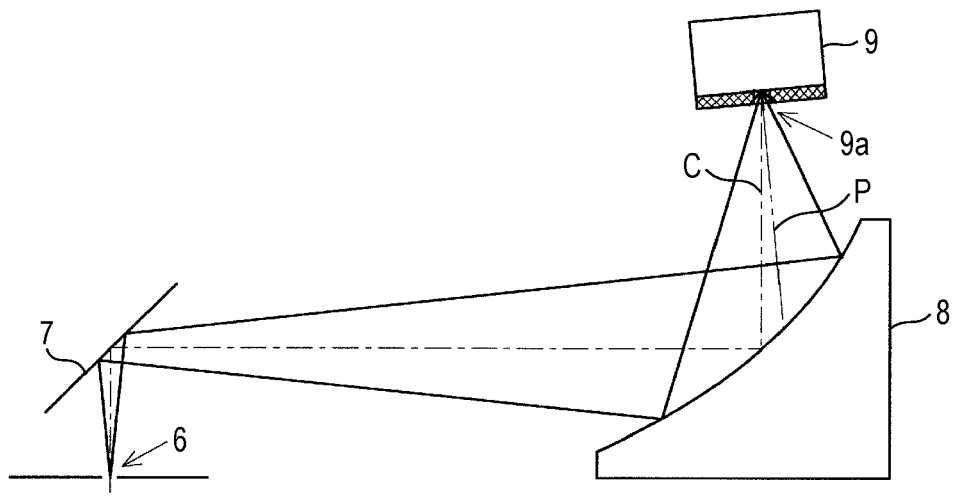
FIG. 5 is an enlarged view of a part of an optical path of measurement light in the infrared microscope of the present embodiment.
Figure 6:
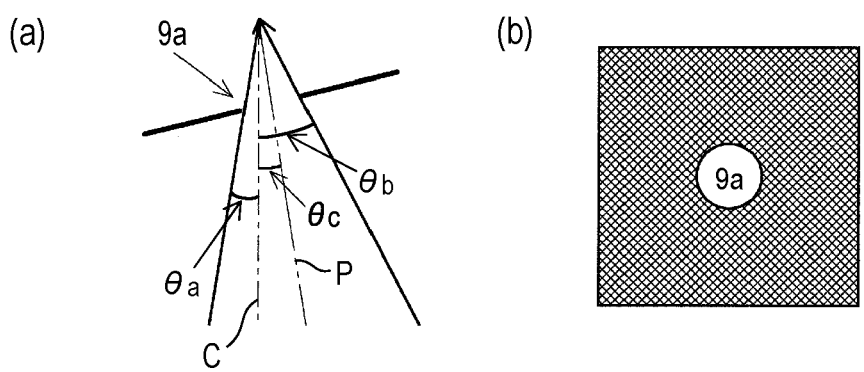
FIG. 6 is a diagram for description of arrangement of an infrared detector and a shape of a cold aperture in the infrared microscope of the present embodiment.

FIG. 5 is an enlarged view of an optical path of the (transmission or reflection) measurement light from the half mirror 7 to the infrared detector 9 in the infrared microscope of the present embodiment. A shielding plate (cold aperture plate) in which a cylindrical through-hole (cold aperture) 9a is formed similarly to FIG. 2 is provided on an incident surface of the infrared detector 9 of the present embodiment.

Figure 3:
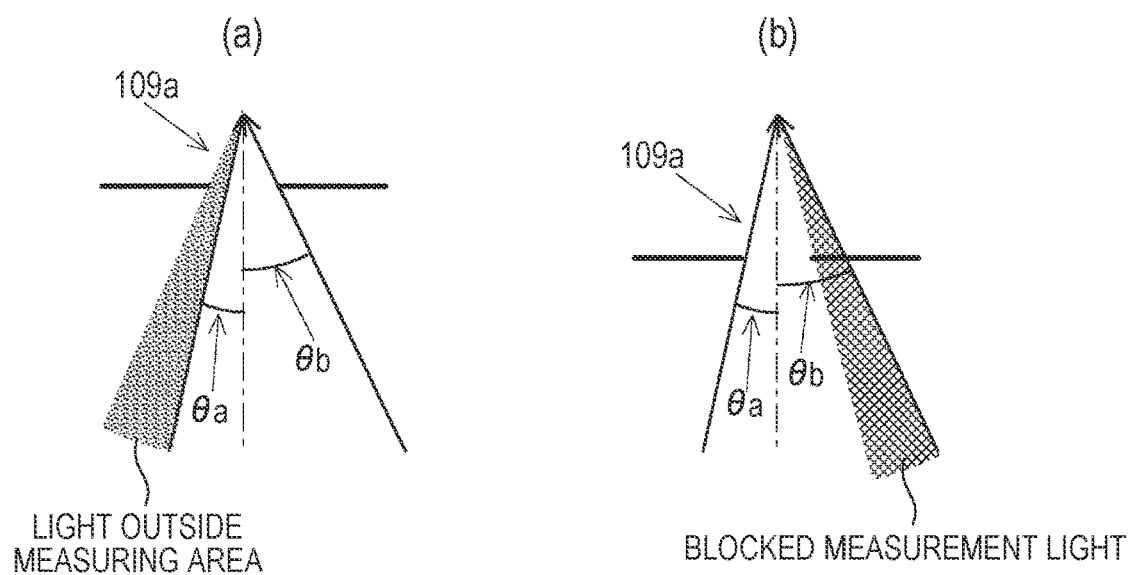
FIG. 3 is a diagram illustrating states in which light outside a measuring area enters the infrared detector and a part of measurement light is blocked by a shielding plate in the conventional infrared microscope.

As described with reference to FIG. 3, a light flux of measurement light reflected by the elliptical concave mirror 8 has a conical shape (deformed conical shape) distorted with respect to an optical axis C thereof. When an angle of a ray of measurement light passing through a left end with respect to the optical axis C is set to θa, and an angle of a ray of measurement light passing through a right end is set to θb within a plane on a paper surface of FIG. 5, the deformed conical shape has an asymmetric cross section satisfying θb>θa. Even though θb>θa is satisfied in the present embodiment, θb<θa may be satisfied depending on the arrangement of each portion.

In this embodiment, as illustrated in FIG. 6(a), the cold aperture plate of the infrared detector 9 is inclined at an angle at which a surface on which the aperture plate transverses a light flux of the deformed conical shape is substantially the same as a shape of an incident-side end surface of the through-hole (that is, a circular shape, see FIG. 6(b)). Specifically, within a plane on a paper surface of FIG. 6(a), a central axis P of a field of view of the infrared detector 9 is inclined by an angle $\theta c = (\theta b - \theta a)/2$ with respect to the optical axis C, and arrangement is performed such that an angle formed between the central axis P and the ray of measurement light passing through the left end with respect to the optical axis C is equal to an angle formed between the central axis P and the ray of measurement light passing through the right end on the paper surface.

As described above, in the infrared microscope of the present embodiment, a cross section of a measurement light flux having a deformed conical shape by the aperture plate is allowed to coincide with the incident-side end surface of the cold aperture 9a using the infrared detector 9 having the cold aperture plate in which the cylindrical cold aperture 9a is formed as in the past. For this reason, all measurement light rays may be allowed to enter the infrared detector 9. In addition, light outside the measuring area may be reliably blocked by the cold aperture plate, and thus there is no concern that such light will enter the infrared detector 9. Therefore, it is possible to analyze the sample with a high S/N ratio.

Figure 7:
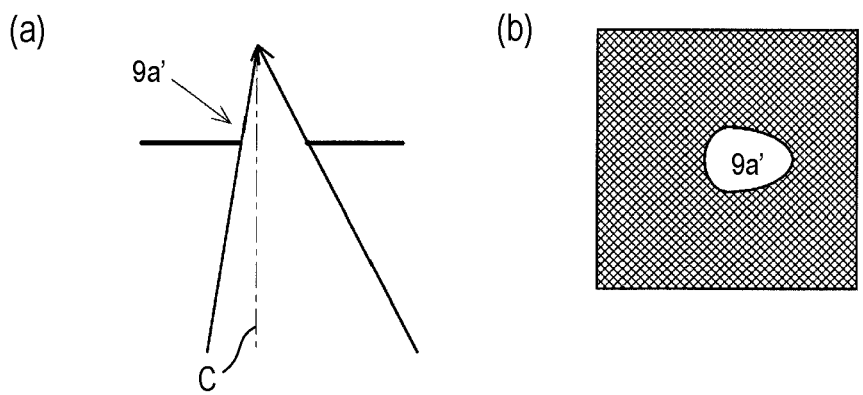
FIG. 7 is a diagram for description of arrangement of an infrared detector and a shape of a cold aperture in an infrared microscope of a modification.

Next, an infrared microscope of a modification will be described with reference to FIG. 7. Since each constituent element of this infrared microscope is the same as that of the above embodiment, illustration and description of each portion will be omitted, and a difference from the above embodiment will be described.

In the infrared microscope of the modification, an infrared detector 9' (and a cold aperture plate) is disposed such that a normal line of a detection surface of the infrared detector 9' (=a normal line of the cold aperture plate) coincides with an optical axis C of measurement light as illustrated in FIG. 7(a). In addition, as illustrated in FIG. 7(b), a cold aperture 9a', which has an incident-side end surface having substantially the same shape as that of a cross section on which the cold aperture plate transverses a measurement light flux having a deformed conical shape, is formed.

In the infrared microscope of this modification, the cross section of the measurement light flux coincides with the shape of the cold aperture 9a' as in the above embodiment, and thus it is possible to allow all measurement light rays to enter the infrared detector 9', and to reliably block light outside a measuring area by the cold aperture plate. Therefore, it is possible to analyze the sample with a high S/N ratio.

When a different Cassegrain mirror from the Cassegrain mirror 5 is used instead of the elliptical concave mirror of the above embodiment and the modification, a conical measurement light flux may be allowed to enter the infrared detector. However, since the Cassegrain mirror is expensive, the infrared microscope becomes expensive when two Cassegrain mirrors are used. That is, the infrared microscope of the above embodiment and the modification has an advantage that the infrared microscope may be manufactured at lower cost when compared to an infrared microscope using two Cassegrain mirrors.

Each of the above embodiment and the modification is an example, and may be appropriately modified in accordance with a spirit of the invention. Arrangement of each portion illustrated in the main part configuration diagram of FIG. 4 is merely an example, and a configuration may be appropriately modified. For example, the transmission measurement infrared light source 1a and the reflection measurement infrared light source 1b may be set as one infrared light source, and an optical element such as a mirror may be appropriately disposed to allow infrared light to be irradiated from each of an upper direction and a lower direction of the sample. In addition, in the above embodiment, arrangement is performed such that the optical axis C of the measurement light reflected by the elliptical concave mirror 8 is in a vertical direction. However, arrangement is performed such that the optical axis is in a horizontal direction.

Further, even though the above embodiment corresponds to the infrared microscope, the invention may be used in various microscopic analysis apparatuses in which measurement light in a wavelength band of light other than infrared light such as visible light, ultraviolet light, etc. is concentrated on an inside of a photodetector by an elliptical concave mirror.

REFERENCE SIGNS LIST

1a transmission measurement infrared light source
1b reflection measurement infrared light source
2 sample
20 mirror
21 half mirror
3 concave mirror
4 convex mirror
5 Cassegrain mirror
6 aperture
7 half mirror
8 elliptical concave mirror
9, 9' infrared detector
9a, 9a' cold aperture
10 imaging lens
11 imaging unit

The invention claimed is:

1. A microscopic analysis apparatus comprising:
   a) a concentrating optical system that concentrates measurement light emitted from a sample in a measuring area on a first concentration point;
   b) an aperture plate having an opening located at the first concentration point;
   c) an elliptical concave mirror that reflects measurement light passing through the opening and concentrates the reflected measurement light on a second concentration point;
   d) a shielding plate disposed in front of the second concentration point, a through-hole having an end surface, whose shape coincides with a shape of a cross section of a light flux of measurement light at a position of the shielding plate, being formed in the shielding plate, where the light flux of the measurement light between the elliptical concave mirror and the photodetector has a deformed conical shape that is distorted with respect to an optical axis defined by a central axis of the light flux of the measurement light concentrated by the concentrating optical system; and
   e) a photodetector provided at the second concentration point,
   wherein the shielding plate is disposed to be perpendicular to the optical axis.

2. The microscopic analysis apparatus according to claim 1, wherein the measurement light is infrared light.

3. A microscopic analysis apparatus comprising:
a) a concentrating optical system that concentrates measurement light emitted from a sample in a measuring area on a first concentration point;
b) an aperture plate having an opening located at the first concentration point;
c) an elliptical concave mirror that reflects measurement light passing through the opening and concentrates the reflected measurement light on a second concentration point;
d) a shielding plate disposed in front of the second concentration point, a through-hole having a circular cross section being formed in the shielding plate; and
e) a photodetector provided at the second concentration point,
wherein the shielding plate is placed such that a central axis of the through hole is inclined by an angle of |θb - θa|/2 with respect to an optical axis of a light flux of the measurement light, the light flux of the measurement light between the elliptical concave mirror and the photodetector has a deformed conical shape that is distorted with respect to the optical axis, the optical axis being defined by a central axis of the light flux of the measurement light concentrated by the concentrating optical system, θa being an angle between the optical axis and a direction of light reflected by the elliptical concave mirror at a position which is farthest from the optical axis at one side of the optical axis in a plane including an axis of the measurement light towards the elliptical concave mirror and an axis of the measurement light reflected by elliptical concave mirror, and θb being an angle between the optical axis and a direction of light reflected by the elliptical concave mirror at a position which is farthest from the optical axis at another side of the optical axis in the plane, and
a shape of an end surface of the through-hole coincides with a shape of a cross section of the light flux of measurement light at a position of the shielding plate.

4. The microscopic analysis apparatus according to claim 3, wherein the measurement light is infrared light.

* * * * *